United States Patent Office 2,749,667
Patented June 12, 1956

2,749,667

CASTING OF TITANIUM SLAG CONCENTRATE

Gerald G. Hatch, Sorel, Quebec, Canada, assignor to Quebec Iron and Titanium Corporation, Wilmington, Del., a corporation of Delaware No Drawing. Application June 10, 1955,
Serial No. 514,763

13 Claims. (Cl. 49—77.5)

This invention relates to the casting of metallurgical slags and, more particularly, to the casting of titanium slag concentrates.

Titanium dioxide for pigment production is generally obtained as a precipitate resulting from controlled hydrolysis of a titanyl sulfate solution. Such a solution is obtained by the sulfuric acid digestion of a titanium dioxide-containing starting material. Although ilmenite sands have been the most common starting material for this purpose, there has been developed a titanium slag concentrate which can be used advantageously in lieu of ilmenite sands.

The production of such a titanium slag concentrate containing at least 60% titanium oxide calculated as titanium dioxide ($TiO_2$), and capable of effective digestion with sulfuric acid, is described in the United States patent to Peirce et al. No. 2,476,453. A particularly advantageous characteristic of this slag concentrate is its controlled content of reduced titanium oxides which are generally referred to collectively as trivalent titanium oxide ($Ti_2O_3$). A certain minimum amount of such reduced titanium oxides in the slag concentrate assures control over the maintenance of all dissolved iron in the titanyl sulfate solution in the form of a ferrous salt, this being advantageous for the reason that any ferric salt present in the titanyl sulfate solution imparts an undesirable color to the precipitated titanium dioxide. Elimination of the presence of any ferric salt in titanyl sulfate solutions produced from ilmenite sands or the like has been achieved heretofore by the addition of scrap iron to the sulfate solution before effecting hydrolysis of the titanyl sulfate. Therefore, an important advantage in using the aforementioned titanium slag concentrate as the starting material for the production of such a titanyl sulfate solution is that the controlled amount of reduced itanium oxides in the slag concentrate maintains all dissolved iron salts in the titanyl sulfate solution in the ferrous state without the addition of iron scrap.

The amount of reduced titanium oxides present in the aforementioned titanium slag concentrates varies inversely with their content of ferrous oxide. Thus, as explained in the Pierce et al. patent, a minimum ferrous oxide content of about 2% (calculated as Fe) corresponds to the most highly reduced slag concentrate, and hence to the highest reduced titanium oxide content, which is compatible with efficient and effective digestability of the slag concentrate in sulfuric acid. Higher contents of reduced titanium oxides, and corresponding to less than about 2% ferrous oxide (calculated as Fe), also tend to stiffen the molten slag with resulting impairment of the efficacy of the reduction operation. And as further explained in the Peirce et al. patent, an upper limit of about 20% ferrous oxide (calculated as Fe) corresponds to the least highly reduced slag concentrate, and hence to the lowest reduced titanium oxide content, which is effective in maintaining the ferrous state of dissolved iron salts in a titanyl sulfate solution obtained by sulfuric acid digestion of the slag concentrate. Thus, these titanium slag concentrates having a ferrous oxide content within the aforementioned limits are characterized by the presence of a significant amount of reduced titanium oxides.

I have found that the reduced titanium oxide content of these slag concentrates containing from 2 to 20% ferrous oxide (calculated as Fe) tends to become oxidized when the molten slag is cooled slowly in the ambient atmosphere following casting. Inasmuch as any rutile titanium dioxide formed by this oxidation is not appreciably attacked by concentrated sulfuric acid, the rutile thus produced represents a loss of titanium in the subsequent digestion and hydrolysis operations. Moreover, any oxidation of the reduced titanium oxides, whether to rutile or to quadrivalent titanate, lowers the availability of the trivalent titanium for conrol of the state of oxidation of dissolved iron in the titanyl sulfate solution. On the other hand, I have found that rapid cooling of the cast slag concentrate at a rate sufficient to minify the development of rutile from the reduced titanium oxides promotes the formation of relatively fine crystals of ferrous titanate which, in the case of the aforementioned slag concentrates, are less completely attacked by sulfuric acid than the slowly cooled slag concentrate. This lower degree of reactivity of the rapidly cooled slag concentrate necessitates the use of more acid with consequent excessive opportunity for the silicate gangue constituent of the slag concentrate to become solubilized and thus contaminate the ultimate titanyl sulfate solution.

I have now discovered that this dilemma can be overcome with the resulting production of a solidified titanium slag concentrate readily amenable to sulfuric acid digestion by pouring the molten slag concentrate into a form of sufficient mass to insure a relatively slow cooling rate until it has completely solidified and by maintaining the surfaces of the solidified mass during subsequent cooling at a temperature below that at which oxidation of reduced titanium oxides occur. Thus, my novel method of casting a molten titanium slag concentrate such as that obtained by thermal reduction of ilmenite and containing at least 60%, and preferably at least 70%, titanium oxide calculated as $TiO_2$ and from about 2 to 20%, and preferably at least 4%, iron oxide calculated as Fe comprises first pouring the slag concentrate while in a fluid molten condition at an incandescent temperature of at least about 1500° C. into a mold of such size as to form a coherent mass of the slag concentrate weighing at least about one ton. This mass of slag concentrate is cooled to a temperature at which it is completely solidified while maintaining at least a major portion of the surface of said mass out of contact with the ambient atmosphere. The surface of the thus-solidified slag concentrate is maintained at a temperature not higher than about 300° C. for a period of time sufficient for the interior portions of the solidified slag concentrate to be cooled to a temperature at which the surfaces will remain at a temperature not higher than about 300° C. in the absence of externally applied cooling. The cooling of the at-least-one-ton mass to the point of substantially complete solidification is advantageously accelerated by applying a cooling fluid to the mass immediately after being poured into the mold. Maintenance of the maximum surface temperature of the slowly solidified slag concentrate may also be facilitated by, and may in fact required, externally applied cooling.

It must be understood that slag concentrates having compositions somewhat outside the aforementioned ranges are also amenable to casting by the method of my invention with the advantages characteristic of this method. However, the titanium slag concentrate produced as described in the aforementioned Peirce et al. patent is representative of those which may be cast with advantage by the method of the present invention. This slag concentrate is produced by electrothermal reduction of ilmenite ore with an amount of carbon substantially less than that which will completely reduce all of the iron oxide component of the ilmenite. By carrying out the smelting operation at a temperature within the range of about 1500° to 1700° C., and with the possible addition only of a small amount of extraneous lime, there is produced in the smelting furnace a body of molten iron and a supernatent layer of the titanium slag concentrate. This concentrate contains, as its essential components, from 2 to 20% iron oxide calculated as Fe, up to 18% lime calculated as CaO, the total amount of the iron oxide and lime ranging between 5 and 20%, and titanium oxide in amount of at least 60% by weight of the slag concentrate when this titanium oxide is calculated as $TiO_2$. The iron oxide, magnesia and lime (from the gangue constituent of the ore) and titanium oxide components of the slag crystallize in the solidified slag predominantly in the form of mixed crystals of ferrous, magnesium, calcium and titanous titanates, and the nontitaniferous gangue constituents of the slag (consisting predominantly of part of the lime, the alumina and the silica) solidify as a vitreous mixture believed to be composed of calcium and aluminum silicates. Part of the titanium oxide component of the slag concentrate is present in the form of trivalent titanium but, in the presence of at least 2% iron oxide, the amount of this reduced titanium oxide does not exceed an amount corresponding to a weight gain of 3.5% attributable to oxidation of the trivalent titanium dioxide to titanium dioxide as a result of an oxidizing heat treatment. Slag concentrate compositions which benefit the most from the casting method of my invention are those coming within the aforementioned range which contain as essential components from 4 to 15% iron oxide calculated as Fe, up to 14% lime calculated as CaO, the total amount of this iron and lime ranging between 5 and 20%, and the balance titanium oxide in amount of at least 70% calculated as $TiO_2$. This presently preferred lower limit of 4% iron oxide in the slag corresponds to, or is an index of, about one-third of the total titanium oxides being present in the reduced form of $Ti_2O_3$ when calculated as $TiO_2$, the remainder of the titanium oxide being present as tetravalent titanium in the form of free or combined titanium dioxide.

Because of the characteristically high titanium oxide content of the aforementioned titanium slag concentrate, it must be maintained at a temperature of at least about 1500° C. in order to assure sufficient fluidity for tapping from the furnace. Consequently, the slag concentrate is poured from the smelting furnace at a brightly incandescent temperature of at least about 1500° C.

The molten titanium slag concentrate is poured, pursuant to the practice of my invention, into individual molds each having a capacity for holding at least about one ton of the slag concentrate in the form of a massive block. Because of the relatively large mass to be contained by each mold, the mold is preferably composed of a heavy steel base plate to which side walls of steel plate are removably bolted. A mold dressing in the form of a lime slurry is advantageously applied to the interior surfaces of the mold before the slag concentrate is poured thereinto.

After the molten slag concentrate is poured into the mold, it is subjected to a first cooling phase in which the entire mass is substantially completely solidified while simultaneously maintaining at least a major portion of the surface of this mass out of contact with the ambient atmosphere. The length of time required for the casting to cool to this extent depends primarily upon the mass of the casting and upon the manner in which it is cooled. If the mass in the mold is cooled simply by radiation, it will require a longer cooling period than if it is artificially cooled by a water spray or by immersion in a body of water promptly after being poured into the mold, but the at-least-one-ton mass of the casting is such that, in spite of the use of artificial cooling, its cooling rate is sufficiently slow to produce relatively large crystals of the titanate which are readily amenable to sulfuric acid digestion.

The cooling of the at-least-one-ton mass to the point of substantially complete solidification may be effected either by radiation or by artificial means, or by a combination thereof. For example, the slag concentrate may be poured into the molds and then be left to cool solely by radiation until the entire mass has solidified, but I have found that this procedure ties up a large number of molds. On the other hand, I have obtained effective and more economical results by spraying the cast mass with water immediately after it has been poured into the molds and for a period sufficient to effect complete solidification of the cast mass. I have also used a combination of these cooling procedures by pouring the molten slag concentrate into the mold, then allowing the cast mass to cool by radiation for a period of time sufficient for it to form a self-supporting crust, removing the crust-encased mass from the mold, and then spraying the resulting mass with water until it has substantially completely solidified.

Protection of the at-least-one-ton mass during its slow cooling to the point of substantially complete solidification is provided either by the mold walls or by the cooling fluid, or by both. For example, while the molten slag concentrate is solidifying in the mold, the mold walls serve to maintain all surfaces of the mass except its upper surface out of contact with the ambient atmosphere. Even the upper surface of the mass in the mold is similarly protected when the solidification is accelerated by artificial cooling such as a water spray over the top and sides of the mold. When the crust-encased mass is removed from the mold prior to complete solidification of its inner portion, the surfaces of the mass are protected by the cooling fluid.

The choice of the aforementioned procedures for effecting solidification of the cast mass is largely one of economics depending upon the amount of slag concentrate to be poured, the availability of the artificial cooling medium, and the holding time available for handling the castings. As an indication of the length of time required for this cooling step, a casting weighing about 6 tons requires a radiation-cooling period in the mold of about 5 hours to form a self-supporting crust. A shorter period of water spraying is sufficient to form such a crust, whereas water spraying of the mold and its contents for a somewhat longer period of 8 hours will effect substantially complete solidification of the mass in the mold. Both types and extent of cooling permit removal of the casting from the mold and handling of the casting with mechanical lifting devices without danger of the casting breaking and spilling any of its interior portion which may still be molten. Thus, at the end of the cooling period required for such crust formation, the side walls of the mold are unbolted and removed and the resulting crust-encased (and still incandescent) mass or block of slag concentrate is then advantageously moved to a suitable supporting structure where all surfaces of the casting will be accessible for artificial cooling while completing the solidification of the entire mass of slag concentrate.

It will be clearly seen, accordingly, that the first stage of my novel casting method is one in which the mass of the cast slag concentrate is such (at least one ton) that its rate of cooling to the point of complete solidification, regardless of the use of artificial cooling, is sufficiently slow to promote the large titanate crystal growth and silicate gangue segregation which lead to ready digestibility of the slag concentrate in sulfuric acid. After the mass has solidified, its rate of subsequent cooling is immaterial but it is important that the surface of the mass during this second cooling phase be controlled in a certain manner.

That is, the cooling of the slag concentrate subsequent to its solidification must be effected under conditions which maintain the surface of the solidified slag concentrate at a temperature not higher than about 300° C. in order to prevent surface oxidation of the mass with resulting oxidation of its trivalent titanium content to sulfuric acid-insoluble rutile. This control is established pursuant to my invention by control of the relationship between the surface area and the volume of the solidified material. For example, if the mass of the solidified slag concentrate is at least about one ton, its surface to volume ratio is such that its surface temperature does not significantly exceed 300° C. while radiating the heat transferred slowly to the surface from the interior of the mass. Thus, a solidified cast block of the slag concentrate weighing about 5 to 6 tons can be permitted to cool while exposed directly to the ambient atmosphere because the slow rate of heat transfer from the interior of the block to its surfaces does not cause the temperature of the surfaces to exceed about 300° C. However, when the larger masses of at least one ton are broken into very much smaller pieces each weighing appreciably less than a ton, these smaller pieces have such a large ratio of surface area to volume that the hot interior of each piece is relatively close to its surface and causes the surface temperature to exceed about 300° C. unless artificial cooling is applied. Thus, control of the surface temperature during this second cooling phase can be achieved either by maintenance of the at-least-one-ton mass of the solidified slag concentrate or by applying artificial cooling to smaller-than-one-ton masses of the solidified but still hot material.

A readily available criterion for determining whether artificial cooling is required during the second cooling phase of my method is the temperature of the surface of the solidified mass rather than a measurement of its surface to volume ratio. That is, if the heat transfer from its interior to its surface causes the surface temperature of each mass to exceed about 300° C., the surface of the material will become excessively oxidized (as evidenced by progressive decrepitation) unless this surface is maintained at a lower temperature by artificial cooling. The types of artificial cooling useful in this second cooling phase are the same as those which are useful in the first phase. That is, although high velocity air jets directed against the surfaces of the cast material are effective for this purpose, as is also immersion of the casting in a large body of water, I presently prefer to artificially cool the casting by bathing it with a fine spray of water. The volume of the spray should be so adjusted as to maintain all surfaces of the casting in a dark or non-incandescent state not appreciably higher than about 300° C. This artificial cooling of the surfaces of the casting is continued until a sufficient amount of heat has been removed from the casting so that when the artificial cooling is discontinued the residual contained heat in the relatively deep interior of the cast mass is insufficient to raise the exterior surfaces of the casting to a temperature significantly above about 300° C.

The length of time required for the second cooling phase is a function primarily of the mass of the casting and of the extent to which it has been cooled while still in the mold. In the case of a 6-ton casting radiation-cooled in the mold and thereafter cooled by a water spray after being removed from the mold, a spray-cooling period of about 8 hours is sufficient. On the other hand, if a relatively large mass of about 6 tons of the slag concentrate is artificially cooled while still in the mold (say by a water spray) until the entire mass has solidified, the resulting mass, after being removed from the mold, can be cooled simply by permitting it to radiate its contained heat to the ambient atmosphere for at least 24 hours.

The solid casting obtained by the foregoing method of my invention, if artificially cooled only to a stable surface temperature not in excess of about 300° C., is then advantageously permitted to cool in the ambient atmosphere to a temperature of about 175° C. so that it will not damage conveyor belts used to carry the cast material through a subsequent operation wherein it is broken, crushed and ground to form a product suitable for digestion with sulfuric acid.

The following specific examples are illustrative of the practice of the invention.

*Example I*

The titanium slag concentrate which was cast by this method contained 72.6% by weight titanium oxide calculated as $TiO_2$, of which the reduced titanium oxides (calculated as $TiO_2$) constituted about 22% of the slag concentrate. It further contained 7.4% ferrous oxide calculated at Fe, 0.23% metallic iron, and roughly 1% lime, 5% magnesium, 6% aluminum and 5% silica. The slag, as tapped from the smelting furnace, was at a temperature of about 1600° C. as measured by an optical pyrometer. The molten slag was poured into a mold of 6 tons capacity comprising a heavy steel base plate with steel plate side walls defining a mold 2½ feet deep and having top inside dimensions of 6¾ feet by 4½ feet tapering down to bottom inside dimensions of 5¾ feet by 3½ feet. The inner surfaces of the mold were coated with a lime slurry before casting in order to facilitate the ultimate removal of the crust-encased casting from the mold. After the 6-ton mass of cast slag concentrate had cooled simply by radiation and without artificial cooling for 5 hours, the resulting incandescent block of slag concentrate had a crust of sufficient strength so that, after the end walls of the mold had been unbolted and removed, the block could be lifted out of the remaining mold structure and onto steel rails mounted on the platform of a railroad flatcar. The edges of the car platform were provided with low side walls which maintained on the bottom of the car a pool of water covering the bottom surface of the cast block. The side walls and top of the block were then cooled continuously with a water spray of sufficient volume to maintain the surfaces of the cast block below a temperature of incandescence. The water spraying of the cast block was continued for a period of 8 hours, and by the end of this period the temperature of the block had been sufficiently lowered so that when the water spray was discontinued the temperature of the surfaces of the block did not rise above 300° C. during subsequent dissipation of the residual contained heat within the interior of the block. The block was then allowed to cool in the ambient atmosphere for 48 hours before being crushed. After crushing and grinding the slag concentrate in a ball mill so that at least 95% passed through a 325 mesh screen (Tyler Standard), the slag concentrate (which still contained about 20% by weight of reduced titanium oxides calculated as $TiO_2$) was readily digested in concentrated sulfuric acid with the recovery of 95.1% of its titanium oxide content (calculated as $TiO_2$) using an acid to slag concentrate ratio of 1.5:1 and with a 92.4% recovery using an acid to slag concentrate ratio of 1.4:1.

*Example II*

A titanium slag concentrate such as that described in Example I was similarly tapped into the same mold, whereupon the mold and its contents were sprayed for a period of about 8 hours. The cast material, which was then substantially completely solidified, was then removed from the mold and was further cooled by water spraying of all exposed surfaces for a period of about 10 hours. At the end of this period, the cast block had been cooled to a temperature of about 175° C. so that it could be broken and carried through the various stages of a crushing operation without damaging the rubber conveyor belts used to carry the material through this operation.

Example III

A titanium slag concentrate such as that described in Example I was tapped into the same 6-ton mold, and the mold and its contents were thereafter sprayed with water for a period of 8 hours. After the completely solidified cast block had been removed from the mold, it was broken into five pieces of approximately equal size (each weighing at least about one ton). These smaller pieces were then sprayed with water until they were cooled to a temperature of about 175° C. so that they could be transferred directly to the crushing operation.

The digestibility of the slag concentrate referred to hereinbefore was determined by the following small scale procedure which has been found by experience to be indicative of the results obtained by commercial scale digestion. The slag concentrate to be digested is ball-milled to 95% through 325 mesh and 100% through 200 mesh. Fifty grams of slag and concentrated sulfuric acid, the quantity of acid depending on the acid/slag ratio, are thoroughly mixed and heated to the desired temperature for initiating reaction between acid and slag in a chamber preheated to 340° C. The temperature required to initiate the reaction is dependent mainly on the acid concentration and the reactivity of the slag. The heated mixture is then transferred immediately to a second chamber where the reaction is allowed to proceed of its own accord. Heat is added to a jacket surrounding the second chamber so as to maintain the jacket in thermal equilibrium with the aforesaid mixture undergoing digestion. After the reaction mass has set up, it is baked in an oven for 2 hours at 200° C. The cake is then broken up and leached with water or with 20% sulfuric acid for 2 hours at 80° C. The leach liquor and the residue are then separately analyzed, and the percent recovery of $TiO_2$ is calculated from these analyses.

The degree of digestibility of the titanium slag concentrate obtained by the block-casting method of the present invention cannot be achieved when the molten slag is cast by other techniques. For example, when the molten slag concentrate described hereinbefore was poured into a stream of cold water so that if solidified as a granular mass, only 86.8% of its titanium oxide content was recovered by the digestion technique referred to hereinbefore using an acid to slag ratio of 1.4:1. Moreover, when the same molten slag concentrate was poured into the molds of a continuous casting machine wherein each mold held about 35 pounds of the concentrate and the cast concentrate was promptly cooled by a water spray, the resulting solid mass reacted somewhat less completely with concentrated sulfuric acid than did the product obtained by my present method and only 86.4% of its titanium oxide content was recovered by the same digestion procedure. The unsatisfactory digestibility of the solid slag concentrate obtained by these two representative rapid-cooling techniques was also characteristic of the product obtained by a diametrically opposite technique. For example, the aforementioned molten slag concentrate was cast into molds of 6 tons capacity and was allowed to cool by radiation until the surface of the casting comprised a self-supporting crust. The still incandescent casting was then removed from the mold and was permitted to cool simply by radiation to the ambient atmosphere. As the casting cooled it broke into large pieces and its surfaces progressively decrepitated until nearly half of the cool solid product physically resembled disintegrated shale. This product reacted sluggishly with concentrated sulfuric acid in the hereinbefore described digestion operation and only 91.6% of its titanium oxide content (calculated as $TiO_2$) was digested using an acid to slag ratio of 1.4:1. At an acid to slag ratio of 1.5:1, the titanium oxide digestion recovery of the water-granulated slag was 92.1%, the recovery for the 35 pound casting was 90.6% and the recovery for the decrepitated 6 ton casting was 94.6%.

It will be appreciated accordingly that the casting method of the present invention makes possible the production of a solid titanium slag concentrate of consistently satisfactory digestibility as evidenced by high recoveries of the titanium oxide component of the slag concentrate and by enhanced reactivity of the slag concentrate with the acid. The latter feature makes possible adequate solubilization of the titanium oxides with a lower acid concentration with resulting diminution of the reaction temperature which, in turn, lessens the consumption of the acid by decomposition to sulfur dioxide, hydrogen sulfide and sulfur. This result appears to flow from the normally slow-cooling characteristics of a massive block-like form because of its low surface-to-mass ratio coupled with the controlled artificial cooling pursuant to the invention. When the slag concentrate has been provided with this ready digestibility by the casing method of the invention, it has further been observed that the efficiency of the digestion operation is markedly less sensitive to minor variations in the digestion technique. The acid-insoluble constituent of the slag concentrate (the siliceous gangue is not significantly attacked by the acid when rapid reaction shortens the duration of the reaction period) is obtained in the form of relatively coarse nodules which, when ground in preparing the slag concentrate for acid digestion, do not form colloidal-size particles but form a dense sludge which is easy to manage during the digestion operation.

This is a continuation-in-part of my copending application Serial No. 421,428, filed April 6, 1954, now abandoned.

I claim:

1. The method of casting a molten titanium slag concentrate obtained by thermal reduction of ilmenite and containing at least 60% titanium oxide calculated as $TiO_2$ and from about 2 to about 20% iron oxide calculated as Fe which comprises pouring the slag concentrate while in a fluid molten condition at an incandescent temperature of at least about 1500° C. into a mold of such size as to form a coherent mass of the slag concentrate weighting at least about one ton, cooling the at-least-one-ton mass of slag concentrate to a temperature at which it is completely solidified while maintaining at least a major portion of the surface of said mass out of contact with the ambient atmosphere, and maintaining the surface of the thus-solidified slag concentrate at a temperature not higher than about 300° C. for a period of time sufficient for the interior portions of the solidified slag concentrate to be cooled to a temperature at which the surfaces will remain at a temperature not higher than about 300° C. in the absence of externally applied cooling.

2. The method of casting a molten titanium slag concentrate obtained by thermal reduction of ilmenite and containing at least 60% titanium oxide calculated as $TiO_2$ and from about 2 to about 20% iron oxide calculated as Fe which comprises pouring the slag concentrate while in a fluid molten condition at an incandescent temperature of at least about 1500° C. into a mold of such size as to form a coherent mass of the slag concentrate weighing at least about one ton, applying a cooling fluid to the at-least-one-ton mass of slag concentrate in the mold so as to cool the mass to a temperature at which it is completely solidified and to maintain all surfaces of said mass out of contact with the ambient atmosphere during this cooling to solidification, and maintaining the surface of the thus-solidified slag concentrate at a temperature not higher than about 300° C. for a period of time sufficient for the interior portions of the solidified slag concentrate to be cooled to a temperature at which the surfaces will remain at a temperature not higher than about 300° C. in the absence of externally applied cooling.

3. The method of casting a molten titanium slag concentrate obtained by thermal reduction of ilmenite and containing at least 60% titanium oxide calculated at $TiO_2$ and from about 2 to about 20% iron oxide calculated as Fe which comprises pouring the slag concentrate while in a fluid molten condition at an incandescent temperature of at least about 1500° C. into a mold of such size as to form a coherent mass of the slag concentrate weighing at least about one ton, water-spraying the exposed surface of said mass and the mold so as to effect cooling of the at-least-one-ton mass of slag concentrate to a temperature at which it is completely solidified while maintaining its surfaces out of contact with the ambient atmosphere, removing the solidified mass from the mold and permitting the removed at-least-one-ton mass to cool by radiation to the ambient atmosphere whereby the surface of the thus-solidified slag concentrate is maintained by said radiation at a temperature not higher than about 300° C. during its cooling to handling temperature.

4. The method of casting a molten titanium slag concentrate obtained by thermal reduction of ilmenite and containing at least 60% titanium oxide calculated as $TiO_2$ and from about 2 to about 20% iron oxide calculated as Fe which comprises pouring the slag concentrate while in a fluid molten condition at an incandescent temperature of at least about 1500° C. into a mold of such size as to form a coherent mass of the slag concentrate weighing at least about one ton, cooling the at-least-one-ton mass of slag concentrate to a temperature at which it is completely solidified while maintaining at least a major portion of the surface of said mass out of contact with the ambient atmosphere, breaking said mass into smaller masses each of which is substantially less than one ton, and applying a cooling fluid to the surfaces of the less-than-one-ton masses so as to maintain their surfaces at a temperature not higher than about 300° C. for a period of time sufficient for the interior portions of the masses to be cooled to a temperature at which their surfaces will remain at a temperature not higher than about 300° C. in the absence of externally applied cooling.

5. The method of casting a molten titanium slag concentrate obtained by thermal reduction of ilmenite and containing at least 60% titanium oxide calculated as $TiO_2$ and from about 2 to about 20% iron oxide calculated as Fe which comprises pouring the slag concentrate while in a fluid molten condition at an incandescent temperature of at least about 1500° C. into a mold of such size as to form a coherent mass of the slag concentrate weighing at least about four tons, water-spraying the exposed surface of said mass and the mold so as to effect cooling of the at-least-four-ton mass of slag concentrate to a temperature at which it is completely solidified while maintaining its surfaces out of contact with the ambient atmosphere, removing the at-least-four-ton mass of solidified slag concentrate from the mold, breaking said mass in smaller masses of at least one ton each, and maintaining the surfaces of the resulting at-least-one-ton masses of solidified slag concentrate at a temperature not higher than about 300° C. for a period of time sufficient for the interior portions of the masses to be cooled to a temperature at which their surfaces will remain at a temperature not higher than about 300° C. in the absence of externally applied cooling.

6. The method of casting a molten titanium slag concentrate obtained by thermal reduction of ilmenite and containing at least 60% titanium oxide calculated as $TiO_2$ and from about 2 to about 20% iron oxide calculated as Fe which comprises pouring the slag concentrate while in a fluid molten condition at an incandescent temperature of at least about 1500° C. into a mold of such size as to form a coherent mass of the slag concentrate weighing at least about one ton, holding the mass of slag concentrate in the mold for a period of time at least sufficient to form a self-supporting crust of solidified slag concentrate surrounding the core of the mass, removing the resulting crust-encased mass from the mold, and applying a cooling fluid to all exposed surfaces of the at-least-one-ton mass removed from the mold, the cooling fluid being applied to said mass in amount sufficient to maintain the exposed surfaces thereof at a temperature not higher than about 300° C. for a period of time sufficient for the entire mass to be cooled to a temperature at which the surfaces will remain at a temperature not higher than about 300° C. in the absence of the externally applied cooling fluid.

7. The method of casting a molten titanium slag concentrate obtained by thermal reduction of ilmenite and containing at least 60% titanium oxide calculated as $TiO_2$ and from about 2 to about 20% iron oxide calculated as Fe which comprises pouring the slag concentrate while in a fluid molten condition at an incandescent temperature of at least about 1500° C. into a mold of such size as to form a coherent mass of the slag concentrate weighing at least about one ton, and thereafter promptly applying a cooling fluid to said mass of slag concentrate and maintaining the application of the cooling fluid to said mass for a period of time sufficient for the entire mass to be cooled to a temperature at which the surfaces will remain at a temperature not higher than about 300° C. in the absence of the externally applied cooling fluid.

8. The method of casting a molten titanium slag concentrate obtained by thermal reduction of ilmenite and containing at least 60% titanium oxide calculated as $TiO_2$ and from about 2 to about 20% iron oxide calculated as Fe which comprises pouring the slag concentrate while in a fluid molten condition at an incandescent temperature of at least about 1500° C. into a mold of such size as to form a coherent mass of the slag concentrate weighing at least about one ton, holding the mass of slag concentrate in the mold for a period of time sufficient only to form a self-supporting crust of solidified slag concentrate surrounding a still molten core, removing the resulting crust-encased but internally molten mass from the mold, and thereafter promptly applying a cooling fluid to all surfaces of the mass in amount sufficient to maintain these surfaces at a temperature not higher than about 300° C. for a period of time sufficient for the entire mass to be cooled to a temperature at which the surfaces will remain at a temperature not higher than about 300° C. in the absence of the externally applied cooling fluid.

9. The method of casting a molten titanium slag concentrate obtained by thermal reduction of ilmenite and containing at least 60% titanium oxide calculated as $TiO_2$ and from about 2 to about 20% iron oxide calculated as Fe which comprises pouring the slag concentrate while in a fluid molten condition at an incandescent temperature of at least about 1500° C. into a mold of such size as to form a coherent mass of the slag concentrate weighing at least about one ton, holding the mass of slag concentrate in the mold for a period of time sufficient only to form a self-supporting crust of solidified slag concentrate surrounding a still molten core, removing the resulting crust-encased but internally molten mass from the mold, and thereafter promptly applying a water spray to all surfaces of the mass in amount sufficient to maintain these surfaces at a temperature not higher than about 300° C. for a period of time sufficient for the entire mass to be cooled to a temperature at which the surfaces will remain at a temperature not higher than about 300° C. in the absence of the externally applied water spray.

10. The method of casting a molten titanium slag concentrate obtained by thermal reduction of ilmenite and containing at least 60% titanium oxide calculated as $TiO_2$ and from about 2 to about 20% iron oxide calculated as Fe which comprises pouring the slag concentrate while in a fluid molten condition at an incandescent temperature of at least about 1500° C. into a mold of such size as to form a coherent massive block of the slag concentrate weighing at least about 6 tons, holding the block of slag concentrate in the mold for a period of time sufficient only to form a self-supporting crust of solidified slag concentrate surrounding a still molten core, removing the resulting crust-encased but internally molten block from the mold, and thereafter promptly applying a cooling fluid to all surfaces of the block in amount sufficient to maintain these surfaces at a temperature not higher than about 300° C. for a period of time sufficient for the entire block to be cooled to a temperature at which the surfaces will remain at a temperature not higher than about 300° C. in the absence of the externally applied cooling fluid.

11. The method of casting a molten titanium slag concentrate obtained by thermal reduction of ilmenite and containing at least 60% titanium oxide calculated as $TiO_2$ and from about 2 to about 20% iron oxide calculated as Fe which comprises pouring the slag concentrate while in a fluid molten condition at an incandescent temperature of at least about 1500° C. into a mold of such size as to form a coherent mass of the slag concentrate weighing at least about one ton, holding the mass of slag concentrate in the mold for a period of time sufficient only to form a self-supporting crust of solidified slag concentrate surrounding a still molten core, removing the resulting crust-encased but internally molten mass from the mold, and thereafter promptly immersing the crust-encased mass in a body of water and in this way maintaining all of the surfaces of the mass at a temperature not higher than about 300° C. for a period of time sufficient for the entire mass to be cooled to a temperature at which the surfaces will remain at a temperature not higher than about 300° C. in the absence of the externally applied cooling fluid.

12. The method of casting a molten titanium slag concentrate obtained by thermal reduction of ilmenite and containing at least 60% titanium oxide calculated as $TiO_2$ and from about 2 to 20% iron oxide calculated as Fe which comprises pouring the slag concentrate while in a fluid molten condition at an incandescent temperature of at least about 1500° C. into a mold of such size as to form a coherent mass of the slag concentrate weighing at least about one ton, applying a cooling fluid to the mass of slag concentrate in the mold for a period of time sufficient to effect substantially complete solidification of said mass, removing the solidified mass from the mold, and applying a cooling fluid to all exposed surfaces of the at-least-one-ton mass removed from the mold, the cooling fluid being applied to said mass in amount sufficient to maintain the exposed surfaces thereof at a temperature not higher than about 300° C. for a period of time sufficient for the entire mass to be cooled to a temperature at which the surfaces will remain at a temperature not higher than about 300° C. in the absence of the externally applied cooling fluid.

13. The method of casting a molten titanium slag concentrate obtained by thermal reduction of ilmenite and containing at least 60% titanium oxide calculated as $TiO_2$ and from about 2 to 20% iron oxide calculated as Fe which comprises pouring the slag concentrate while in a fluid molten condition at an incandescent temperature of at least about 1500° C. into a mold of such size as to form a coherent mass of the slag concentrate weighing at least several tons, applying a cooling fluid to the mass of slag concentrate in the mold for a period of time sufficient to effect substantially complete solidification of said mass, removing the solidified mass from the mold, breaking the solidified mass of several tons into smaller portions having a mass of at least about one ton each, and applying a cooling fluid to all exposed surfaces of the at-least-one-ton masses removed from the mold, the cooling fluid being applied to said masses in amount sufficient to maintain the exposed surfaces thereof at a temperature not higher than about 300° C. for a period of time sufficient for the entire mass to be cooled to a temperature at which the surfaces will remain at a temperature not higher than about 300° C. in the absence of the externally applied cooling fluid.

No references cited.